United States Patent [19]

McDonald

[11] Patent Number: 5,109,392
[45] Date of Patent: Apr. 28, 1992

[54] DIVERSITY RECEIVER ARRANGEMENT FOR DIGITAL SIGNALS

[75] Inventor: Oliver F. McDonald, East Orange, N.J.

[73] Assignee: Bell Telephone Laboratories, Inc., Murray Hill, N.J.

[21] Appl. No.: 350,959

[22] Filed: May 11, 1989

[51] Int. Cl.⁵ .............................................. H04B 7/04
[52] U.S. Cl. ...................................... 375/85; 455/137; 375/100
[58] Field of Search ................... 375/100, 102, 39, 40, 375/84, 56, 85, 86; 455/135, 137-139, 273

[56] References Cited

U.S. PATENT DOCUMENTS

| | | | |
|---|---|---|---|
| 3,566,274 | 2/1971 | Toro | 455/273 |
| 3,815,028 | 6/1974 | Rabow | 455/138 X |
| 3,864,633 | 2/1975 | Strenglein | 455/134 |
| 3,991,377 | 11/1976 | Salazar et al. | 329/105 |
| 4,083,009 | 4/1978 | Bickford et al. | 375/100 |
| 4,271,525 | 6/1981 | Watanabe | 375/14 |
| 4,291,409 | 9/1981 | Weinberg et al. | 375/100 |
| 4,397,036 | 8/1983 | Hirade et al. | 455/137 |
| 4,675,863 | 6/1987 | Paneth et al. | 370/50 |
| 4,700,366 | 10/1987 | Henriksson | 375/100 |
| 4,710,945 | 12/1987 | Bocci et al. | 375/100 |
| 4,731,801 | 3/1988 | Henriksson | 375/100 |
| 4,752,941 | 6/1988 | Takahara et al. | 375/100 |
| 4,817,089 | 3/1989 | Paneth et al. | 370/95 |
| 4,879,728 | 11/1989 | Tarallo | 375/84 |

Primary Examiner—Benedict V. Safourek
Assistant Examiner—Tesfaldet Bocure

[57] ABSTRACT

A diversity receiving system for a differential phase shift keyed digital signal having symbols occurring in successive time periods comprises at least one antenna and a plurality of receiving branches. Each receive branch operates on a different version of the digital signal and detects different type prescribed components of the phase difference between successive symbols of the branch version. A detected prescribed component of the phase difference of each type is formed for each successive time period by processing the same type detected prescribed phase difference component signals from the receive branches.

11 Claims, 11 Drawing Sheets

DIVERSITY RECEIVER ARRANGEMENT FOR DIGITAL SIGNALS

FIELD OF THE INVENTION

The invention relates to radio communication systems and more particularly to diversity type receiving arrangements employing diversity to improve reception.

BACKGROUND OF THE INVENTION

In many radio communication systems, signals are propagated along several paths between its source and its destination. If the source and destination are stationary, optimum results may be obtained by proper antenna location. Mobile systems, however, are subject to uncontrolled multipath propagation. The signal at the destination is usually a composite of two or more differing versions of the signal applied to the source antenna. For high frequency channels, some or all versions of the transmitted signal are reflections from fixed or moving obstacles which arrive at the destination at different times. The radio channel is frequently subjected to severe multipath fading so that the signal to noise ratio deteriorates. As is well known in the art, mobile systems are subject to short and deep fades generally termed Rayleigh type fading. While the quality of voice communication is affected by the multipath fading in mobile systems, the received signal is usually intelligible. For digital signals, fading increases the error rate. The larger error rate in turn increases number of data retransmissions, increases the number of handoffs for voice or raises the power level needed for adequate reception.

As is well known in the art, fading can be mitigated by spatial diversity. U.S. Pat. No. 3,864,633 issued Feb. 4, 1975 to H. Strenglein discloses a space diversity communication system in which signal fading is reduced through use of closely spaced antenna sensors. Sum and difference signals formed from the outputs of the antenna sensors are analyzed to select or combine the antenna outputs or to electronically steer the system receptivity pattern.

U.S. Pat. No. 4,271,525 issued Jun. 2, 1981 to K. Watanabe discloses an adaptive diversity receiver for digital communications in which a plurality of transversal filters are disposed in front of a linear combiner. The tap gains of each transversal filter are updated to estimate the sampled values of the impulse response for the channel as a function of the detected data output rather than as a function of the data error signal. The transversal filters operate as adaptive matching filters for the diversity channels.

U.S. Pat. No. 4,752,941 issued Jun. 21, 1988 to S. Takahara et al discloses a diversity receiving system in which a phase shift circuit adjusts the phase of one or more of a plurality of received signals to improve signal combining. U.S. Pat. No. 4,731,801 issued Mar. 15, 1988 to J. Henriksson discloses a method for reception and detection of digital systems using diversity. The demodulated in-phase baseband signals and the quadrature baseband signals are separately summed and detected in-phase and quadrature phased signals are obtained therefrom. This optimizes recpetion by adjusting the phases of the received signals using mean square deviation or signal projection criteria.

The foregoing techniques require relatively complex arrangements to adjust the phases of the signals from the plurality of antennas. U.S. Pat. No. 4,675,863 issued to E. Paneth et al Jun. 23, 1987 and U.S. Pat. No. 4,817,089 issued to E. Paneth et al Mar. 28, 1989 disclose a spatial diversity system wherein a spatial diversity combiner circuit receives demodulated data symbols, AGC values, signal+noise, magnitude and phase error and determines the best demodulated symbol using a majority vote and calculations of signal to noise ratios for each modem. The complexity of signal co-phasing is replaced by majority voting of separately derived symbols based on a complex variety of factors rather than on a direct analysis of the diversity signals. Consequently, the characteristics of the differential phase component signals are not used for multipath fade distortion correction.

U.S. Pat. No. 4,397,036 issued Aug. 2, 1983 to K. Hirade et al discloses a diversity system utilizing a plurality of branches for an angle modulated digital signal transmission which avoids phase adjustments of received signals. Rather than co-phasing, the received signal on each branch is modulated with orthogonally related local signals having the same period as the digital signal. The modulated signals are combined by simply summing them, and the combined signal is differentially detected. While co-phasing of received signals is not required in U.S. Pat. No. 4,397,036, the restrictions on the frequency of the local signal limit the application of the technique.

In many mobile systems such as cellular telephone, it may be necessary to retune the receiver system to different channels at nearby frequencies. In such systems, it is difficult and more expensive to maintain the needed relationship between the received and local signals of Hirade. It is an object of the invention to provide an improved diversity arrangement for digital signals which avoids the complexity of co-phasing, prescribed relationships between the received and local signals and complex processing of demodulated symbols.

SUMMARY OF THE INVENTION

The foregoing object is achieved by separately detecting the components of each version of a transmitted signal received in a spaced antenna array. Components for symbol selection are obtained by processing the detected components of the plurality of signal versions. Advantageously, symbol selection is based on a direct analysis of component versions but co-phasing or special signal relationships are avoided.

The invention is directed to a diversity receiving system for a differential phase shift keyed digital signal having symbols occurring in successive time periods. The system comprises at least one antenna and a plurality of receiving branches. Each receive branch operates on a different version of the digital signal and detects a plurality of signals each representing a prescribed component of the phase difference between successive symbols of the branch version. A detected prescribed component of the phase difference for each successive time period is formed by processing the detected prescribed phase difference component signals from the receive branches.

According to one aspect of the invention, a plurality of spaced antennas are used to provide spatial diversity. Each antenna is connected to a separate receive branch so that each branch receives a different version of the digital signal. Each receive branch is adapted to demodulate the received version of the differential phase shift keyed digital signal from its connected antenna and to differentially phase detect the in-phase and quadrature phase components of the received version.

According to another aspect of the invention, the differentially detected in-phase and quadrature phase outputs from the separate receive branches are applied to selection apparatus which selects the most likely detected differential in-phase component and independently selects the most likely detected differential quadrature phase component among the receiving means outputs. The most likely signals may be those closest in magnitude to a predetermined expected value.

According to yet another aspect of the invention, the differentially detected in-phase and quadrature phase outputs from the separate receive branches are applied to selection apparatus which squares and sums the differentially detected in-phase and quadrature phase signals from each receiving branch differential detector. The sum of the squares of the differentially detected in-phase and quadrature phase signals from the receiving branch outputs are compared and the largest value is used to select the branch from which the symbol decision is made.

According to yet another aspect of the invention, the differentially detected in-phase and quadrature phase outputs from the separate receive branches are applied to selection apparatus which compares the differentially detected in-phase and quadrature phase signals from the separate branches and selects the strongest in-phase and the strongest quadrature phase signals.

According to yet another aspect of the invention, selection apparatus adds together samples of the differentially detected in-phase outputs of the separated receive branches and separately adding together samples of the differentially detected quadrature phase outputs of the separate branches. The composite signal is thereby forced into the most likely quadrant to render symbol decision more accurate.

DESCRIPTION OF THE DRAWING

FIG. 3 is a flowchart illustrating the general operation of the circuits of FIGS. 1 and 2;

DETAILED DESCRIPTION

Figure 1:
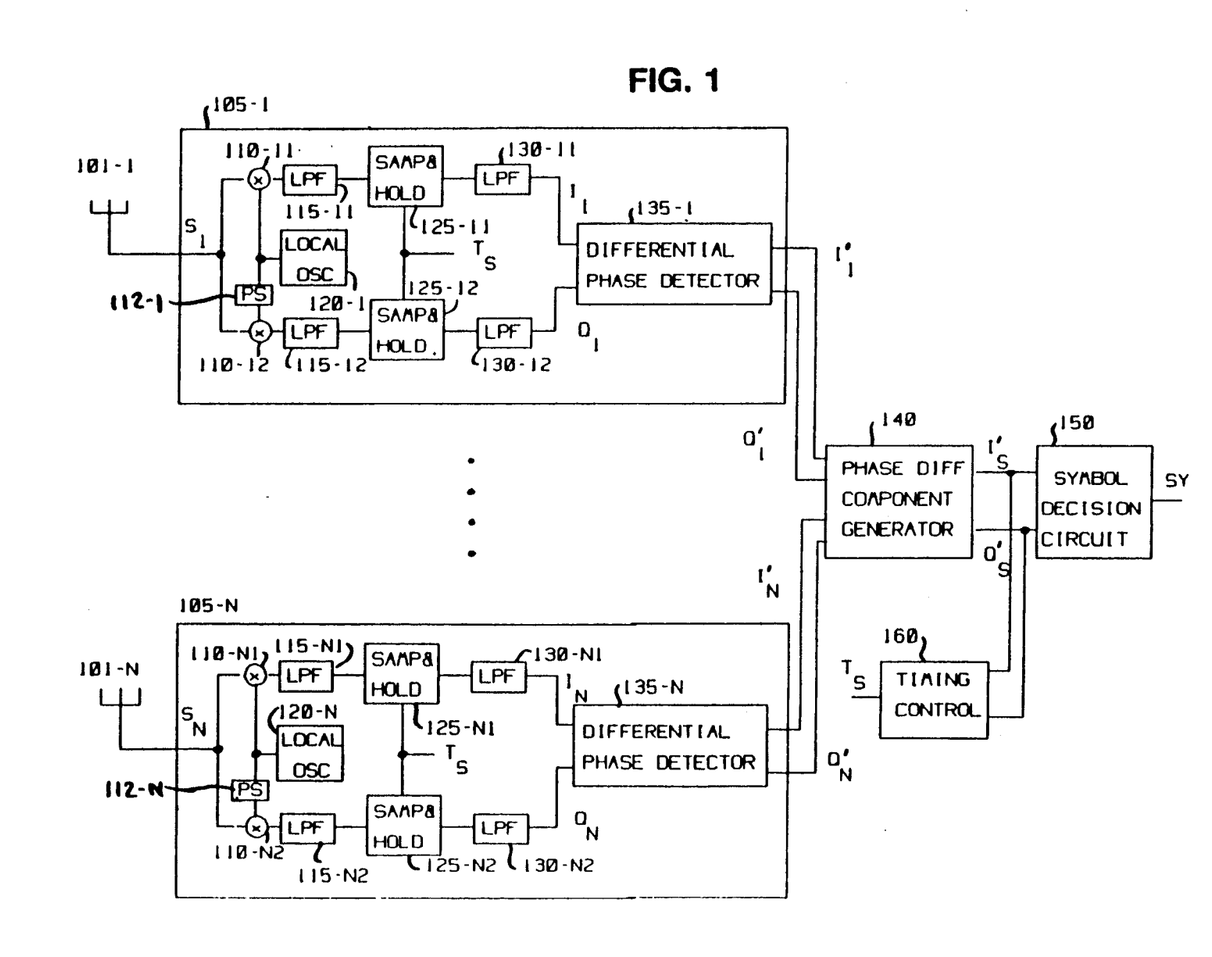
FIG. 1 depicts a general block diagram of a space diversity receiving system illustrative of the invention.

FIG. 1 shows a general block diagram of a quarternary differential phase shift keying (QDPSK) receiving arrangement and FIG. 3 is a flowchart illustrating the general operation of the circuit of FIG. 1. As is well known in the art, quarternary phase shift keying is a form of phase modulation in which a digital stream is partitioned into symbols 00, 01, 10, and 11. Each symbol corresponds to two bits of information and is encoded on a carrier in the form of an in-phase component and a quadrature phase component. The amplitude of the modulated carrier may be constant or shaped to minimize intersymbol interference and each symbol is assigned to a different quadrant of a phase plane.

In a QDPSK arrangement, the difference between successive symbols is encoded as a prescribed phase shift $\pi/4$, $3\pi/4$, $5\pi/4$ or $7\pi/4$ instead of encoding each symbol type as a prescribed phase. A prescribed carrier phase shift of $\pi/4$ indicates no change between successive symbols, e.g., 00, 00. A change such as 00, 01 is indicated by a carrier phase shift of $3\pi/4$ radians/sec. Similarly, a phase shift of $5\pi/4$ radians/sec results from the sequence 00, 11 and a phase shift of $7\pi/4$ radians/sec is obtained from a 00, 10 sequence. In order to demodulate a received signal, it is only necessary to determine the phase shift from symbol period to symbol period.

The spatial diversity arrangement of FIG. 1 includes a plurality of spaced antennas 101-1 through 101-N and associated receiving circuits 105-1 through 105-N to improve reception of digital signals over a channel subject to multifade interference. Each of circuits 501-1 through 501-N receives a different version $S_n$ of the signal transmitted over the channel from its associated antenna as indicated in steps 301-1 and 301-N of FIG. 3. Circuit 105-1, for example, receives signal $S_1$ from antenna 101-1, forms baseband in-phase and quadrature phase components $I_1$ and $Q_1$ (step 305-1) and produces an in-phase differential component $I'_1$ as well as a quadrature component $Q'_1$ for each successive digital symbol SY in the channel signal (step 310-1). In like manner, circuit 105-N produces in-phase differential component $I'_N$ and quadrature phase differential component $Q'_N$ in response to signal $S_N$ from antenna 101-N. This is shown in steps 301-N, 305-N and 310-N in FIG. 3.

Signals $I'_1$ through $I'_N$ and $Q'_1$ through $Q'_N$ from receiving circuits 105-1 through 105-N are processed in phase difference component generator 140 (step 320) to form signals $$I'_S, Q'_S = f(I'_1, Q'_1, \ldots, I'_n, Q'_n, \ldots, I'_N, Q'_N). \quad (1)$$

According to the invention, the processing arrangements of generator 140 combine and/or select in-phase and quadrature phase components of the different spatial diversity receiving circuits to compensate for multipath fading. In this way, the signal to noise ratio is significantly improved. In contrast to known spatial diversity receivers, there is no need for complex co-phasing arrangements or strict requirments on the local oscillator signal for diversity signal combining. Signals I'$_S$ and Q'$_S$ obtained in phase difference component generator 140 are combined as is well known in the art in symbol decision circuit 150 to determine the digital symbol SY (step 325). Signals I'$_S$ and Q'$_S$ are also used by timing control circuit 160, well known in the art, to produce pulses to sample the signals in receivers 105-1 through 105-N at the optimum times for detection of succeeding digital symbols.

Signal S$_1$ from antenna 101-1 is supplied to mixers 110-11 and 110-12 in circuit 105-1. Local oscillator 120-1 is tuned to that of the selected channel so that baseband signals are produced by mixers 110-11 and 110-12. The output of local oscillator 120-1 is applied directly to mixer 110-11 and through 90 degree phase shifter 112-1 to mixer 110-12. Low pass filters 115-11 and 115-12 remove unwanted components from the baseband outputs of mixers 110-11 and 110-12. Consequently, in-phase signal $$I_1 = \sum_n g(t - nT) (\cos\phi_n - \theta_c)_1 \quad (2)$$

is obtained from filter 115-11 and quadrature phase signal $$Q_1 = \sum_n g(t - nT)\sin(\phi_n - \theta_s)_1 \quad (3)$$

is obtained from filter 115-12.

Signals I$_1$ and Q$_1$ are periodically sampled in sample and hold circuits 125-11 and 125-12 by timing signals T$_S$ from timing control 160. The successive samples of circuits 125-11 and 125-12 are filtered in low pass filter circuits 130-11 and 130-12 and applied to differential phase detector 135-1. The differential phase detector forms a signal $$I'_1 = \tfrac{1}{2}\cos(\phi_n - \phi_{n-1}) \quad (4)$$

corresponding to the difference between samples of immediately successive digital time periods in-phase components and a signal $$Q'_1 = \tfrac{1}{2}\sin(\phi_n - \phi_{n-1}) \quad (5)$$

corresponding to the difference between samples of immediately successive digital time periods in-phase components and a signal $$Q'_1 = \tfrac{1}{2}\sin(\phi_n - \phi_{n-1}) \quad (5)$$

corresponding to the difference between samples of immediately successive digital time periods quandrature phase conmponents.

Figure 9:
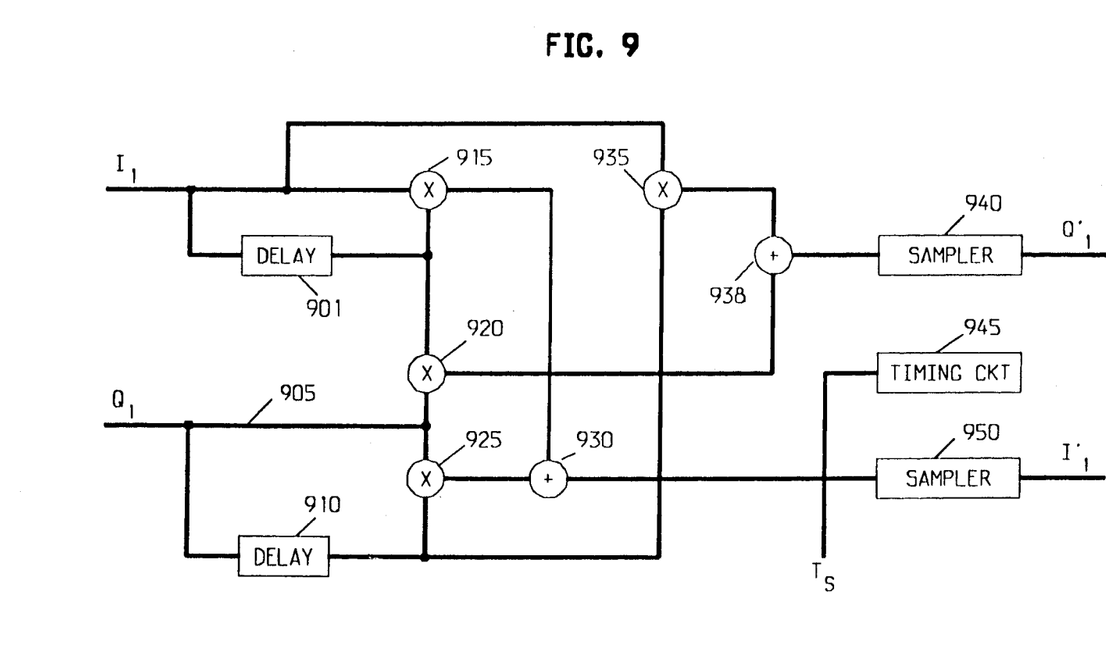
FIG. 9 is a block diagram of a circuit that may be used as the differential detector in FIG. 1.

FIG. 9 shows a more detailed block diagram of a differential detector arrangement that may be used in the circuit of FIG. 1 in accordance with the disclosure of U.S. Pat. No. 3,991,377 issued Nov. 9, 1976 to A. D. Salazar et al. Referring to FIG. 9, signal I$_1$ from low pass filter 130-11 is applied directly to multiplier 915 and through a one symbol period (T) delay 901. The output of multiplier 915 is $$\tfrac{1}{4} \sum_n g(t - nT) \sum_n g(t - nT - T) [\cos(\phi_n + \phi_{n-1} - 2\theta) + \cos(\phi_n - \phi_{n-1})] \quad (6)$$

Similarly, signal Q$_1$ from low pass filter 130-12 is applied directly to multiplier 925 via lead 905 and through one period delay 910. The multiplier output is $$\tfrac{1}{4} \sum_n g(t - nT) \sum_n g(t - nT - T) [\cos(\phi_n - \phi_{n-1}) - \cos(\phi_n + \phi_{n-1} - 2\theta)] \quad (7)$$

The outputs of multipliers 915 and 925 are summed in adder 930 to produce the in-phase differential signal $$I_{diff}(t) = \tfrac{1}{2} \sum_n g(t - nT) \sum_n g(t - nT - T)\cos(\phi_n - \phi_{n-1}) \quad (8)$$

For sampling at times t=nT, I$_{diff}$(nT) reduces to $$I'_1 = \tfrac{1}{2}\cos \Delta\phi \quad (9)$$

where $\Delta\phi = \phi_n - \phi_{n-1}$.

Multiplier 935 receives the signal I(t−nT) from low pass filter 130-11 and the signal from low pass filter 130-12 delayed one symbol period T(Q(t−nT−T)) in delay 910 and forms the product signal $$\tfrac{1}{4} \sum_n g(t - nT) \sum_n g(t - nT - T) [-\sin(\phi_n + \phi_{n-1} - 2\theta) + \sin(\phi_n - \phi_{n-1})] \quad (10)$$

while multiplier 920 receives the signal Q(t−nT) from low pass filter 130-12 and the signal from low pass filter 130-11 delayed one symbol period in delay 901 (I(t−nT−T)) to form the product signal $$\tfrac{1}{4} \sum_n g(t - nT) \sum_n g(t - nT - T)[-\sin(\phi_n + \phi_{n-1} - 2\theta)] \quad (11)$$

The output of multiplier 920 is subtracted from the output of multiplier 935 in adder 938 so that the resultant signal therefrom is $$Q_{diff} = \tfrac{1}{2} \sum_n g(t - nT) \sum_n g(t - nT - T)\sin\Delta\phi \quad (12)$$

For sampling at times t=nT, Q$_{diff}$(nT) reduces to $$Q'_1 = \tfrac{1}{2}\sin \Delta\phi \quad (13)$$

Figure 8:
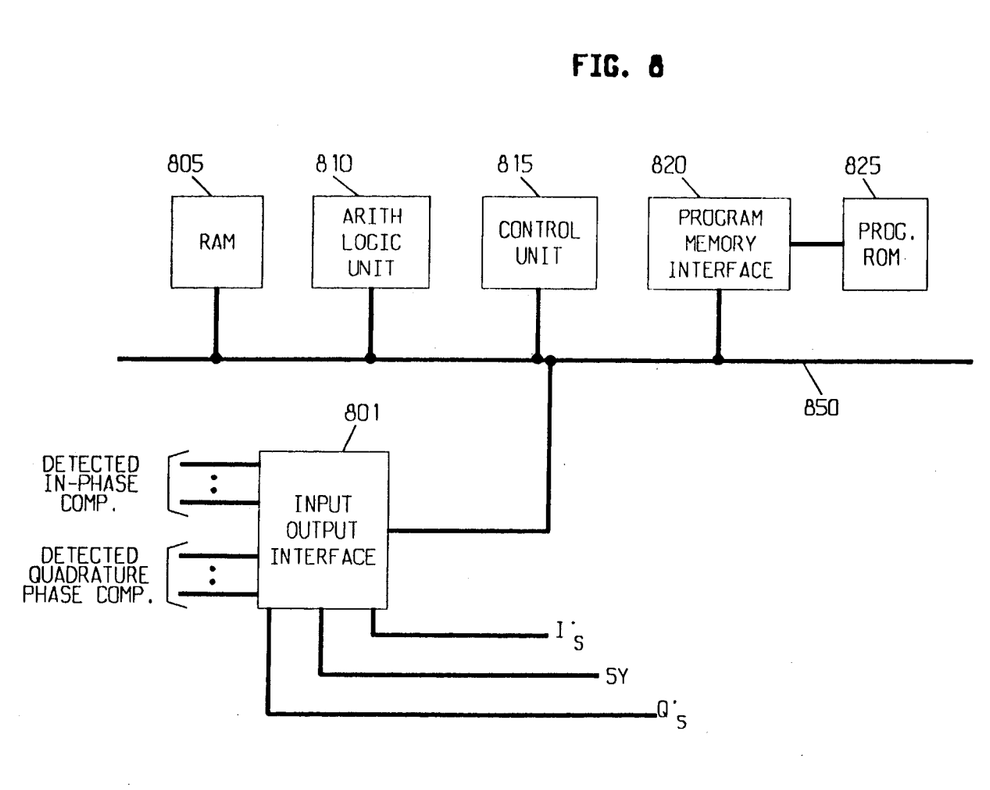
FIG. 8 is a block diagram of a signal processor that may be used in the differential detection processing and the phase difference component generator of FIGS. 1 or 2.

Referring again to FIG. 1, the outputs of receiving circuits 105-1 through 105-N are applied to phase difference component generator 140. Generator 140 is adapted to process the I'$_1$, Q'$_1$, ..., I'$_N$, Q'$_N$ signals to obtain the optimum values for the in-phase I'$_S$ and quadrature phase Q'$_S$ components of the current symbol SY. The processing is performed in a digital signal processor such as the Western Electric type DSP 16 Digital Signal Processor illustrated in simplified form in FIG. 8 in accordance with instruction codes permanently stored therein. In FIG. 8, signals I'$_1$ through I'$_N$ and Q'$_1$ through Q'$_N$ are received by input-output interface 801 and transferred therefrom to random access memory 805 via bus 850 under control of control unit 815. The instructions controlling the operation of the processor are stored in program read only memory 825. Control unit 815 directs the generation of signals I'$_S$ and Q'$_S$ in arithmetic logic unit 810 and the transfer of the I'$_S$ and $Q'_S$ signals to symbol decision circuit 150 of FIG. 1 and timing circuit 160 via input-output interface 801 in response to the instruction codes stored in program memory 825.

Figure 4:
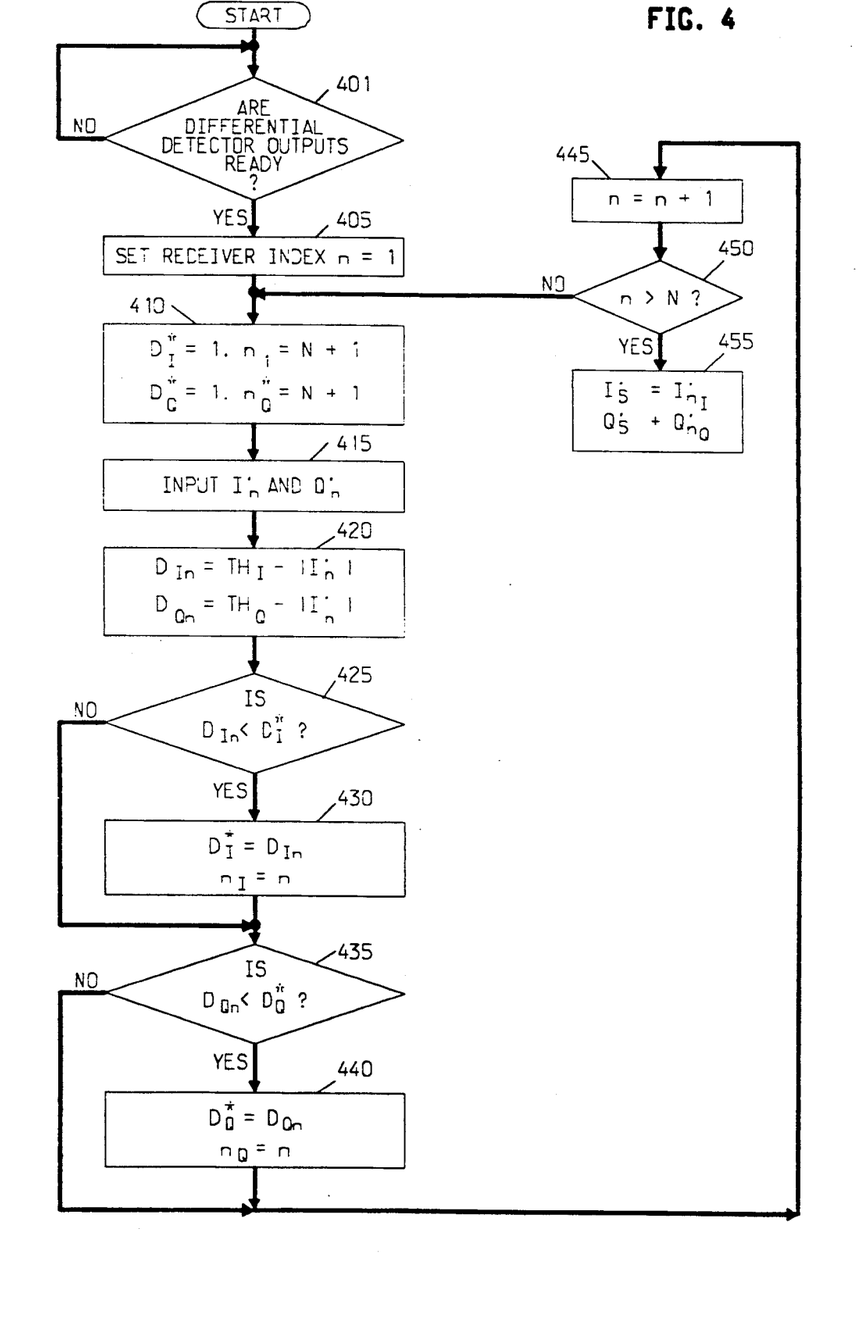
FIG. 4 is a flowchart illustrating the operation of the phase difference component generation of FIG. 3 using the maximum likelihood signal selection method of the invention.

One instruction set arrangement according to the invention is illustrated in the flowchart of FIG. 4. According to FIG. 4, the processor of FIG. 8 is programmed to select the most likely detected differential in-phase component among signals $I_1$ through $I_N$. The most likely detected differential quadrature phase component among the signals $Q_1$ through $Q_N$ is independently selected by the processor. To do this, each receive circuit signal $I'_N$ is compared to the ideal value $TH_I$. The signal $I'_N$ closest to the ideal value is selected as $I'_S$. In like manner each receive circuit signal $Q'_N$ is compared to the ideal value $TH_Q$ and the closest is selected as $Q'_S$.

Referring to FIG. 4, the processing for each symbol period is started when it is determined that the differential detector outputs are ready in decision step 401. Receiver index n is set to one (step 405) so that the signals $I'_1$ and $Q'_1$ from receiving circuit 105-1 are addressed. Best difference signals $D^*_I$ and $D^*_Q$ are initially set to one and corresponding best receive circuit indices $n^*_I$ and $n^*_Q$ are set to $N+1$ in step 410. Differential in-phase and quadrature phase signal samples $I'_N$ and $Q'_N$ are accessed (step 415). The deviation of the absolute value of $I'_N$ from $TH_I$ $$D_{In} = TH_I - |I'_n| \qquad (14)$$

and the deviation of the absolute value of $Q'_N$ from $TH_Q$ $$D_{Qn} = TH_Q - |Q'_n| \qquad (15)$$

are formed in step 420. If signal $D_{In}$ is less than signal $D^*_I$ (step 425), $D^*_I$ is set to $D_{In}$ and $n^*_I$ is set to n (step 430). Otherwise $D^*_I$ and $n^*_I$ remain unchanged. In either event, decision step 435 is entered wherein signal $D_{Qn}$ is compared to signal $D^*_Q$. When $D_{Qn}$ is less than $D^*_Q$, $D^*_Q$ is set to $D_{Qn}$ and $n^*_Q$ is set to n in step (440). Otherwise signals $D^*_Q$ and $n^*_q$ remain unchanged. Receiving circuit index n is incremented in step 445. The incremented value is compared to the last receiver index N (step 450). The loop from step 410 to step 450 is iterated until receiving circuit index n is greater than N. When step 455 is entered from step 450, signal $n^*_I$ is set to the receiving circuit having the differential in-phase component with the least deviation from the ideal value. Signal $n^*_Q$ is set to the receiving circuit having the differential quadrature phase value closest to the ideal value. Signal $I'_S$ is set to $I'_{N^*I}$ and signal $Q'_S$ is set to $Q'_{N^*Q}$ in step 455. At this time, the symbol SY for the current time period can be formed in symbol decision circuit 150.

Figure 5:
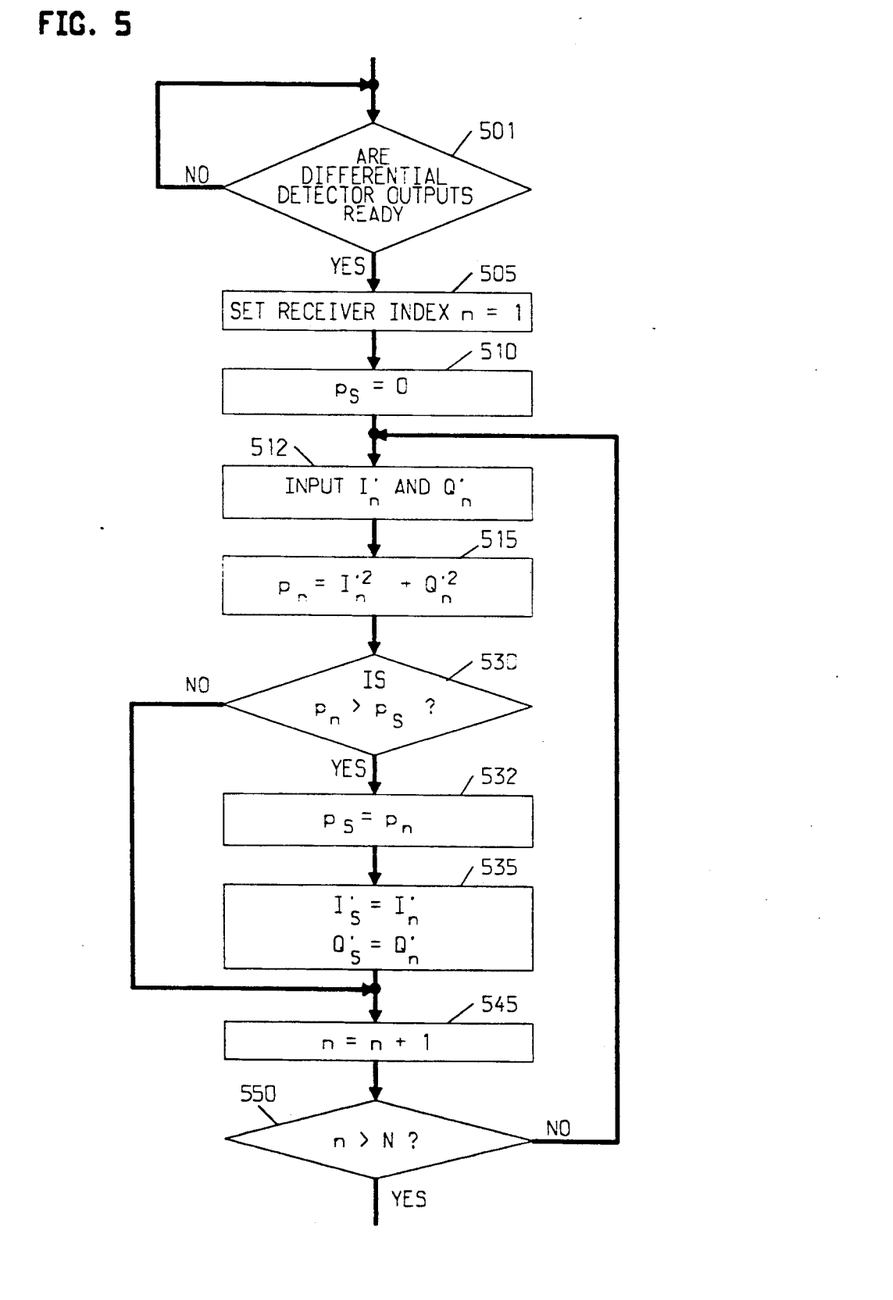
FIG. 5 is a flowchart illustrating the operation of the phase difference component generation of FIG. 3 using the differentially detected quadrature strength signal selection method of the invention.

A second instruction set arrangement according to the invention is illustrated in the flowchart of FIG. 5. As per FIG. 5, the processor of FIG. 8 is programmed to square and add the in-phase and quadrature phase signals from each receiving branch differential detector to form a signal $$P_n = (I'_n)^2 + (Q'_n)^2 \qquad (16)$$

The different branch outputs $P_n$ the calculated power output of the detector for each branch are then compared. The largest value is used to select the branch from which the symbol decision is made.

Referring to FIG. 5, the selection operation starts when the outputs of differential detectors for the current symbol are available as indicated in step 501. Initially, receiver index n is set to one (step 505). Signal $p_S$ corresponding to the selected value of equation (16) is set to zero in step 510. The selection loop from step 512 to step 550 is then entered. The differential in-phase and quadrature phase components $I_n$ and $Q_n$ obtained from differential detector 135-n are input (step 512). Signal $p_n$ is formed according to equation (16) (step 515) and compared to signal $p_S$ (step 530).

If signal $p_n$ is larger than signal $p_S$ in step 530, signal $p_S$ is changed to $p_n$ (step 532). Selected differential in-phase component $I'_s$ is set to $I'_n$, selected quadrature phase component $Q_s$ is set to $Q'_n$ in step 535 and step 545 is entered from step 535. When signal $p_n$ is not larger than signal $p_S$ in step 530, step 545 is entered from step 530. Receiver index n is incremented in step 545. The incremented receiver index is compared to the last receiver index N in step 550. The loop from step 512 to step 550 is iterated from $n=1$ through $n=N$. When n is greater than N, signal, $p_S$ is the maximum of signals $p_n$ for differential detectors 135-1 through 135-N. Signals $I'_s$ and $Q'_s$ corresponding to signal $p_S$ are then available for symbol decision. Control may then be passed to symbol decision circuit 150.

Figure 6:
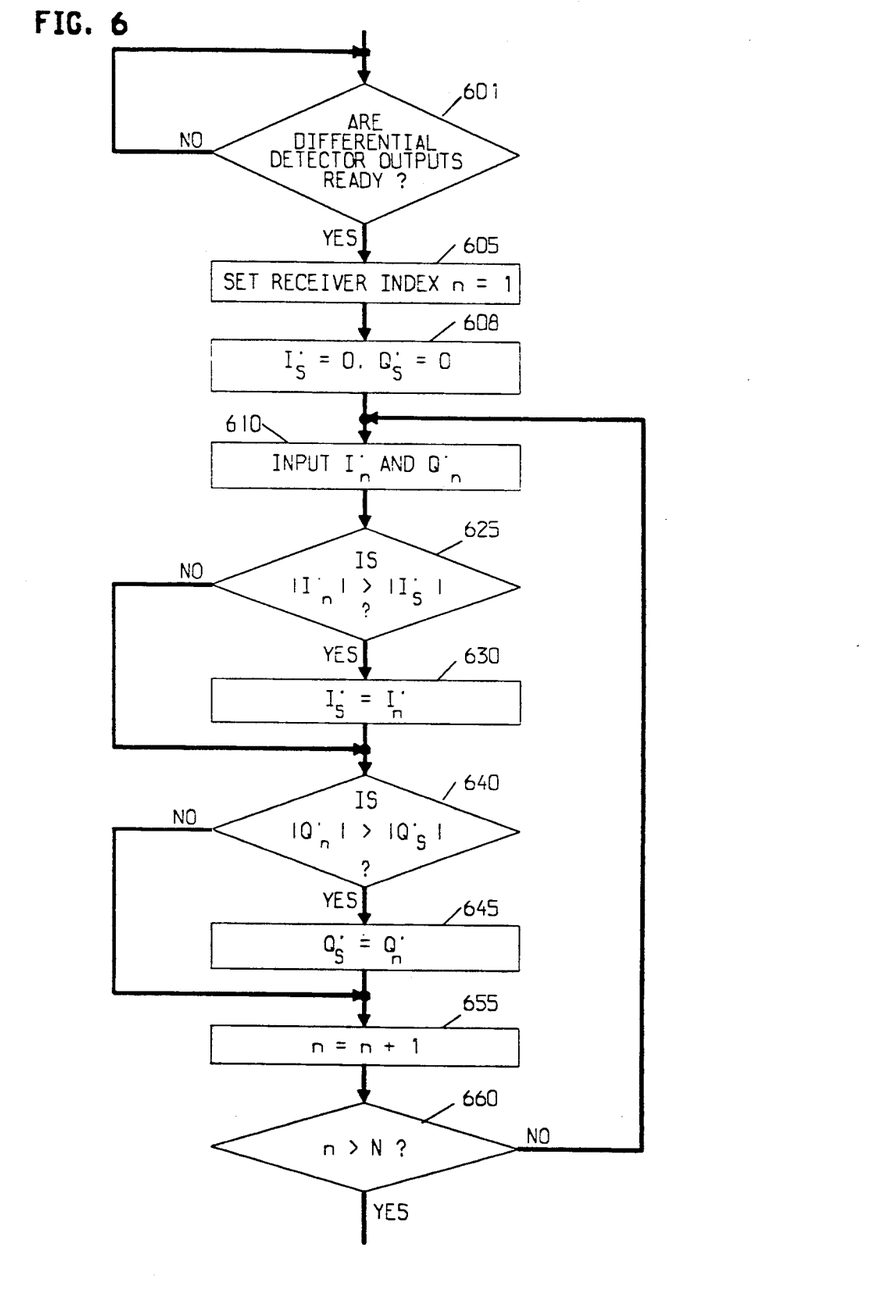
FIG. 6 is a flowchart illustrating the operation of the phase difference component generation of FIG. 3 using the differentially detected independent signal component selection method of the invention.

A third instruction set arrangement according to the invention is illustrated in the flowchart of FIG. 6. In the processing illustrated in FIG. 6, the differentially detected in-phase signals from the branches are compared to each other and the differentially detected quadrature phase signal samples from the branches are compared to each other. The strongest in-phase and the strongest quadrature phase signals are independently selected.

Referring to FIG. 6, receiver index n is set to one (step 605) after all differential detector outputs are ready in step 601. Initially, the selected differential in-phase and quadrature phase component signals $I_s$ and $Q_s$ are set to zero (step 608). The loop from step 610 to step 660 is then iterated so that the values for signals $I'_s$ and $Q'_s$ correspond to maximum $I'_n$ and the maximum $Q'_n$. Signals $I'_n$ and $Q'_n$ are input in step 610.

If signal $|I'_n|$ is greater than $|I'_s|$ in step 625, the current value for $I'_s$ is replaced by $I'_n$ (step 630). Otherwise signal $I'_s$ remains unchanged. Step 640 is then entered in which differential quadrature phase signal $|Q'_n|$ is compared to the current value for $|Q'_s|$. When $|Q'_n|$ is greater than the current value for $|Q'_s|$, the value of $Q'_n$ (step 645). Otherwise step 655 is entered directly from step 640. Receiver index n is incremented in step 655 and the incremented index is compared to the last receiver index N in step 660. The loop from step 610 to step 660 is iterated until receiver index n is greater than N in step 660. At that time, signal $I'_s$ is the maximum of the $I'_n$ signals and signal $Q'_s$ is the maximum of the $Q'_n$ signals. Control is then passed to symbol decision circuit 150.

Figure 7:
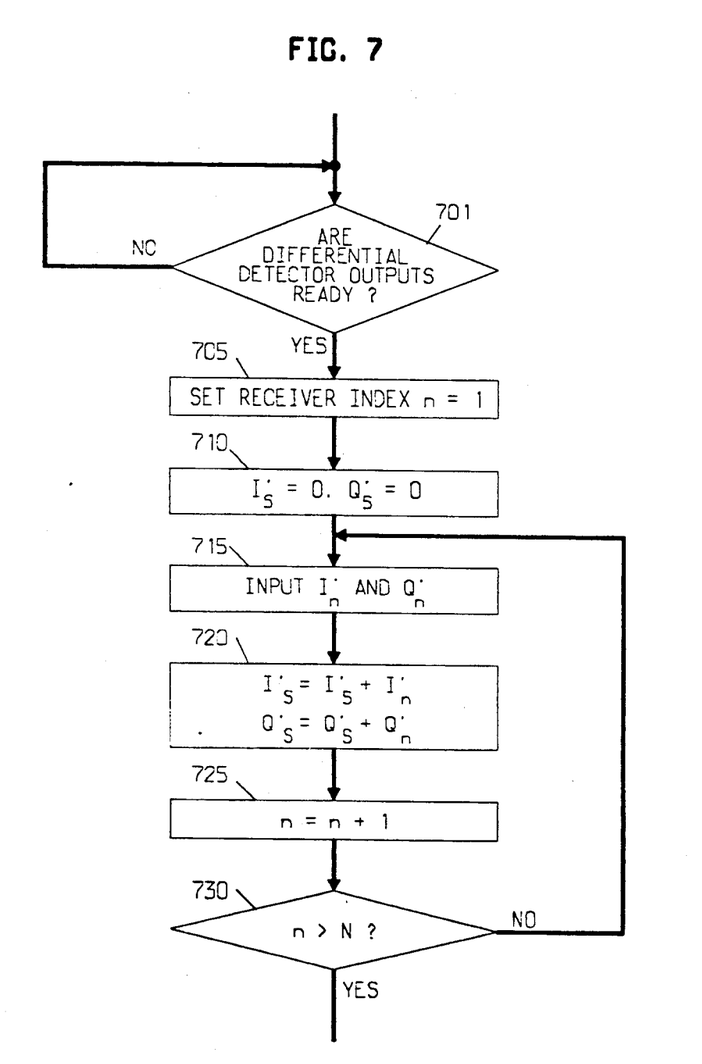
FIG. 7 is a flowchart illustrating the operation of the phase difference component generation of FIG. 3 using the differentially detected equal gain combining signal method of the invention.

A fourth instruction set arrangement according to the invention is illustrated in the flowchart of FIG. 7. According to the processing illustrated in FIG. 7, the samples of the differential in-phase samples of the branches are added together and the samples of the differential quadrature phase samples from the branches are added together. Signal $I'_s$ is selected as the composite in-phase sample and signal $Q'_s$ is selected as the composite quadrature phase sample. The composite samples provide the most likely quadrant for symbol detection.

Referring to FIG. 7, receiver index n is set to one (705) and signals $I'_s$ and $Q'_s$ are initially set to zero (step 710) after the differential detector outputs are ready in step 701. The loop from step 715 to step 730 is iterated to form the sum of the $I'_n$ signals and to form the sum of the $Q'_n$ signals. The differential in-phase and quadrature phase signals are input in step 715. Signal $I'_s$ is incremented by $I'_n$ and signal $Q'_s$ is incremented by signal $Q'_n$ (step 720). Receiver index n is incremented (step 725) and the incremented index n is compared to last receiver index N in step 730. The loop from step 715 to step 730 is iterated until the receiving branch index is greater than N. At this time, the symbol SY for the present time period may be formed in symbol decision circuit 150.

Symbol decision circuit 150 is operative to determine the quadrant in which the resultant of signals $I'_s$ and $Q'_s$ falls as is well known in the art. The symbol decision may be generated in the processor of FIG. 8 using an instruction set stored in program read only memory 825. The same process or may be used to form signals $I'_s$, $Q'_s$ and SY. The instruction set may be adapted to detect the signs of signals $I'_s$ and $Q'_s$ and to generate a symbol dibit responsive thereto. For example, if the signs of both signals $I'_s$ and $Q'_s$ are positive, a 0,0 dibit is formed. If the sign of signal $I'_s$ is negative while the sign of signal $Q'_s$ is positive, a 0,1 dibit is formed. If the signs of both signals $I'_s$ and $Q'_s$ are negative, a 1,1 dibit is formed. When the sign of signal $I'_s$ is positive while the sign of signal $Q'_s$ is negative, a 0,1 dibit is formed. The flowchart of FIG. 11 illustrates this method.

Figure 11:
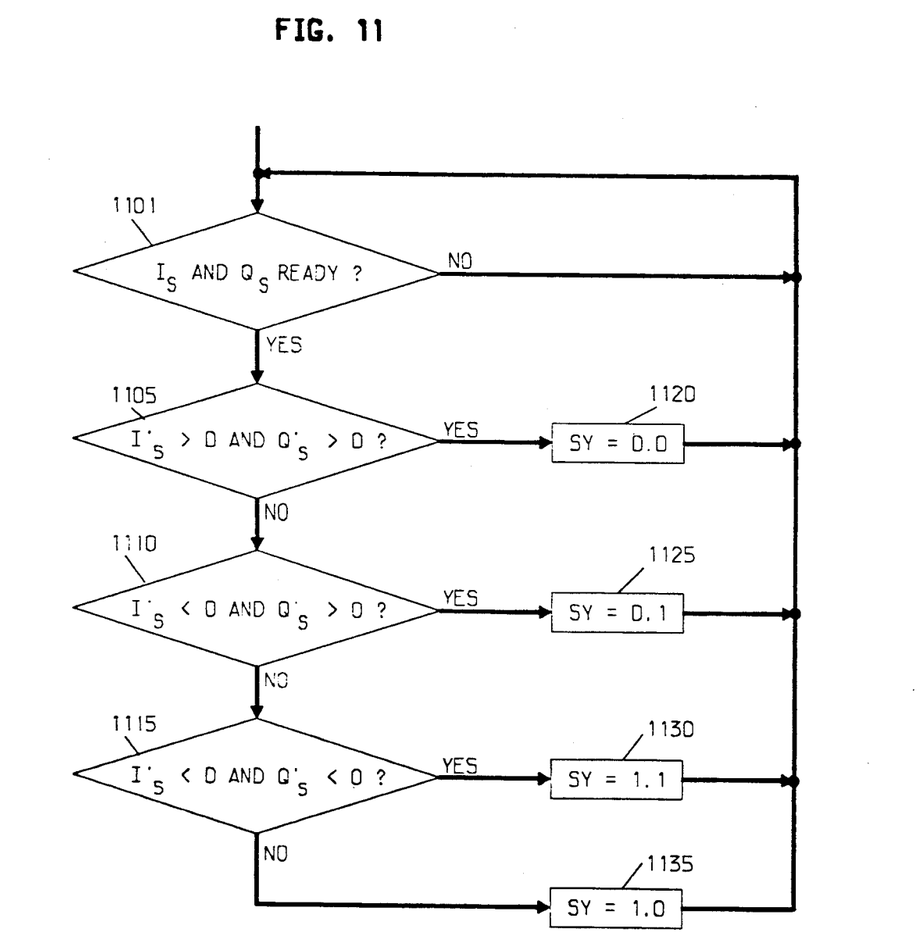
FIG. 11 is a flow chart illustrating the symbol decision processing operations of FIGS. 1 and 2.

In FIG. 11, the symbol decision operations of steps 1105 through 1135 are started for the current time period when the signals $I'_s$ and $Q'_s$ for the time period are ready (step 1101). If it is determined that signals $I'_s$ and $Q'_s$ are both positive (step 1105), the symbol SY is set to 0,0 in step 1120. Otherwise, signals $I'_s$ and $Q'_s$ are checked in step 110 to determine if signal $I'_s$ is negative while signal $Q'_s$ is positive. If the conditions of step 1110 are met, signal SY is set to 0,1. Where both signals $I'_s$ and $Q'_s$ are negative (step 1115), symbol SY is set to 1,1 in step 1130. When signal $I'_s$ is negative while signal $Q'_s$ is positive, signal SY is set to 1,0 in step 1135. Other arrangements well known in the art may also be used.

Figure 2:
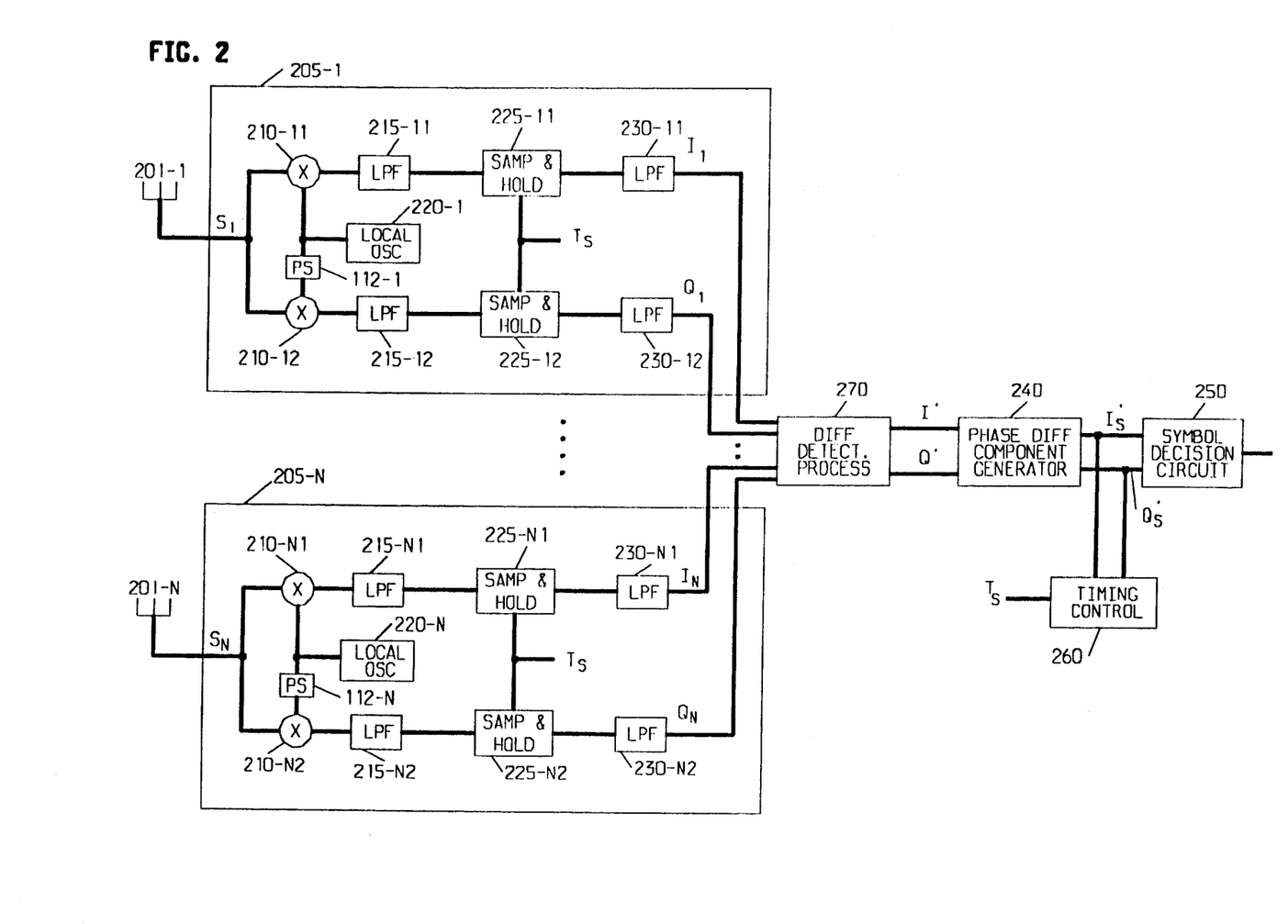
FIG. 2 depicts a general block diagram of another space diversity receiving system illustrative of the invention.

FIG. 2 shows another spatial diversity receiving arrangement that is similar to that of FIG. 1 except that each receiving circuit 205-1 through 205-N does not include a differential phase detector. As described with respect to FIG. 1, the different versions of the transmitted signal are received by diversity spaced antennas 201-1 through 201-N. Each version $S_n$ is sent to a separate receiving circuit. Receiving circuit 205-1, for example, receives signal version $S_1$. The $S_1$ signal is applied to mixers 210-11 and 210-12. Mixer 210-11 receives the signal from local oscillator 200-1 while mixer 210-12 receives the phase shifted local oscillator signal from shifter 212-1. As in FIG. 1, the mixers are adapted to produce quadrature phased signals I and Q translated to baseband. Low pass filters 215-11 and 215-12 remove higher order components from the translated I and Q signals. Sample and hold circuits 225-11 and 225-12 sample the I and Q signals in accordance with the timing determined by timing control circuit 260. Low pass filters 230-11 and 230-12 filter the I and Q samples.

I and Q samples are supplied from each receiving circuit 205-1 through 205-N to differential detection processor 270 which may be the digital signal processor shown in FIG. 8. An instruction code set is added to program memory 825 to perform the differential detection of the outputs of the receiving circuits 205-1 through 205-N. When used in this manner, the inputs to input-output interface 801 are the in-phase and quadrature phase samples from receiving circuits 205-1 through 205-N.

Figure 10:
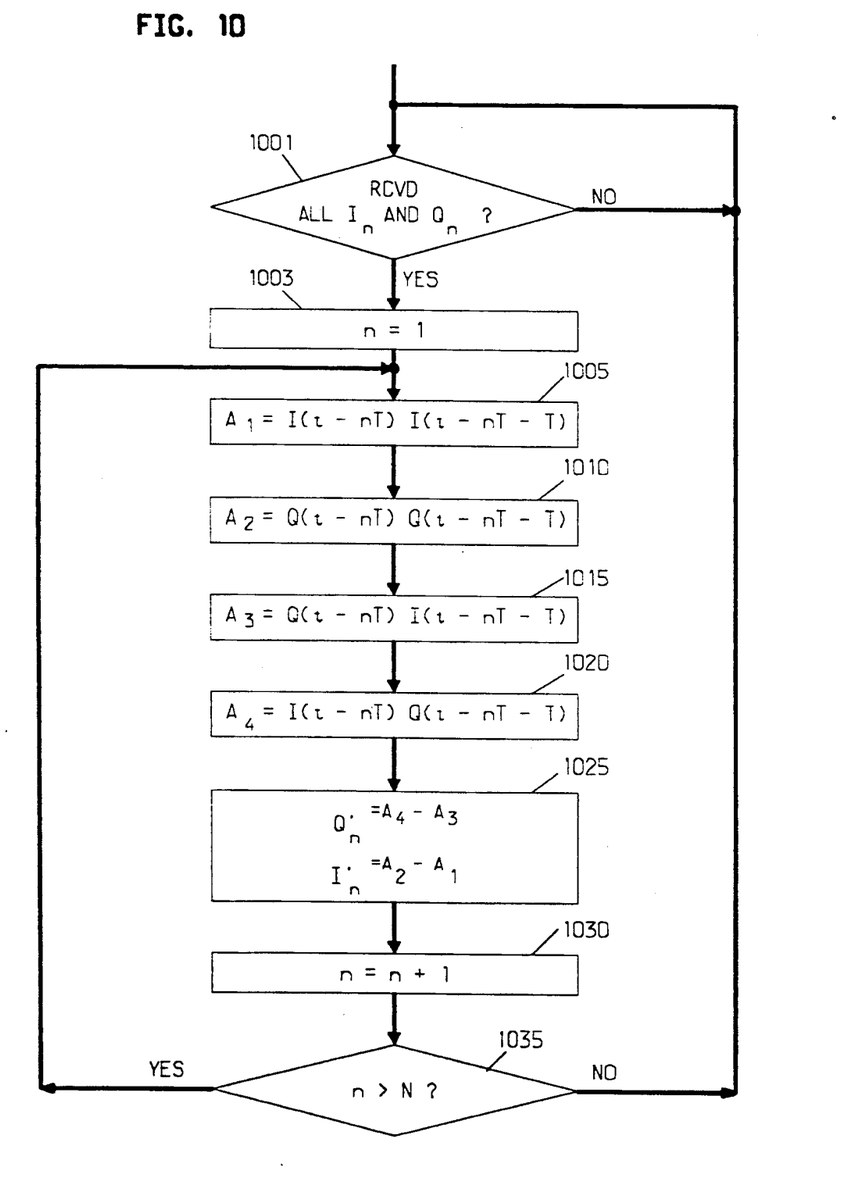
FIG. 10 is a flowchart illustrating the differential detection processing operations of FIG. 2.

FIG. 10 is a flowchart illustrating the operation of the processor of FIG. 8 in performing the differential detection. Referring to FIG. 10, the differential detector operation begins in step 1005 after a determination that all the in-phase and quadrature signals have been received from all receiving circuits 205-1 through 205-N for the current symbol (step 1001). Receive circuit index is set to one in step 1003. The arithmetic functions of steps 1005, 1010, 1015 and 1020 are then performed to generate component signals $A_1$ through $A_4$ as per steps 1005, 1010, 1015 and 1020.

In step 1005, signal I(t-nT) for the current symbol n from filter 230-11 is multiplied by the signal I(t-nT-T) of the previous symbol as described with respect to multiplier 915 in FIG. 9. In step 1010, signal Q(t-nT) for the current symbol is multiplied by signal Q(t-nT-T) for the previous symbol as done in multiplier 925. The product of signals Q(t-nT) and I(t-nT-T) is produced in step 1015 corresponding to multiplier 920 and the product of signals I(t-nT) and Q(t-nT-T) is generated in step 1020 corresponding to multiplier 935. A signal $Q'_n$ is generated by subtracting the product signal of step 1015 ($A_3$) from the product signal of step 1020 ($A_4$) as described with respect to adder 938 and a signal $I'_n$ is generated by summing the signals from step 1005 ($A_1$) and 1010 ($A_2$) in step 1025 corresponding to adder 930.

Receive circuit index n is incremented in step 1030 and the incremented value is compared to N in step 1035. The loop from step 1005 to step 1035 is iterated until the signals for circuit 205-N have been processed. After signals $I'_N$ and $Q'_N$ have been generated, the operations of the processor are switched to the instruction code set for phase difference component generation as previously described with respect to FIG. 1.

The invention has been described with reference to illustrative embodiments thereof. It is apparent, however, to one skilled in the art that various modifications and changes may be made without departing from the spirit and scope of the invention.

I claim:

1. A diversity arrangement in a mobile radio system subject to multipath fading for a differential phase shift keying digital signal having a sequence of symbols occurring in successive symbol time period comprising:

a plurality of spaced antennas means for receiving a plurality of versions of a transmitted digital signal;

a plurality of receiving branches each connected to the antenna means, each receiving branch including means responsive to one version of the digital signal from the antenna means for demodulating the one version of the transmitted digital signal in each symbol period to form at least two baseband signals each baseband signal being representative of a prescribed phase of the one version of the transmitted digital signal in the symbol time period, and means responsive to each prescribed phase baseband signal from the demodulating means for generating a signal representative of a prescribed component of the phase difference between the prescribed phase baseband signals of immediately successive symbol periods of the one digital signal version; and means connected to the phase difference prescribed component signal generating means of the plurality of receiving branches responsive to the generated prescribed phase difference component signals for each successive symbol time period from the plurality of receiving branches for forming a signal representing each prescribed component of the phase difference signal and deciding which of the formed baseband signals is a signal corresponding to the transmitted digital signal of the current signal period by comparing a strength of the formed signal with a strength of plurality of probable received signals.

2. A diversity arrangement in a mobile radio system subject to multipathfading for a differential phase shift keying digital signal having a sequence of symbols occurring in successive symbol time periods according to claim 1 wherein the means for forming the prescribed component of the phase difference signal and deciding which of the formed baseband signals is a signal corresponding to the transmitted digital signal of the current symbol period comprises means for setting a predetermined amplitude threshold for each prescribed component of the phase difference signal corresponding to the transmitted digital signal, means responsive to each generated phase difference prescribed component signal from the plurality of branches for generating a signal representative of the absolute amplitude value of the phase difference prescribed component signal, means for forming a signal corresponding to the difference between the predetermined amplitude threshold and each absolute amplitude value signal, and means for selecting the branch phase difference prescribed component signal having the minimum amplitude difference corresponding signal.

3. A diversity arrangement in a mobile radio system subject to multipath fading for a differential phase shift keying digital signal having a sequence of symbols occurring in successive symbol time periods according to claim 1 wherein the means for forming the prescribed component of the generated prescribed phase difference signal and deciding which of the formed baseband signals is a signal corresponding to the transmitted digital signal of the current symbol period comprises means responsive to the generated phase difference prescribed component signals from each branch for squaring each phase difference precribed component signal, means responsive to the squared phase difference prescribed component signals from each branch for summing the squared phase difference prescribed signals of the branch, means responsive to the summed squared phase difference prescribed component signals from each branch for forming a first signal representative of the sum of the squares of the phase difference prescribed component signals for each branch;

means responsive to each of the first signals derived from each of the plurality of branches for determining the maximum valued one of the first signal s and means responsive to the maximum valued first signal for selecting the generated phase difference prescribed component signals of the branch having the maximum valued first signal.

4. A diversity arrangement in a mobile radio system subject to multipath fading for a differential phase shift keying digital signal having a sequence of symbols occurring in successive symbol time periods according to claim 1 wherein the means for forming the prescribed component of the phase difference signal and deciding which of the formed baseband signals is a signal corresponding to the transmitted digital signal of the current symbol period comprises means responsive to each generated phase difference prescribed component signal from the plurality of branches for determining the maximum value of the generated phase difference prescribed component signals of the branches, and means for selecting the determined maximum value of each generated phase difference prescribed component signal as the phase difference prescribed component signal corresponding to the transmitted digital signal.

5. A diversity arrangement in a mobile radio system subject to multipath fading for a differential phase shift keying digital signal having a sequence of symbols occurring in successive symbol time periods according to claim 1 wherein the means for forming the prescribed component of the phase difference signal corresponding to the transmitted digital signal of the current symbol period comprises means responsive to the generated phase difference prescribed component signals of the same type from the plurality of branches for algebraically summing the generated phase difference prescribed component signals of the same type to form a composite phase difference prescribed component signal corresponding to the transmitted digital signal.

6. A diversity arrangement in a mobile radio system subject to multipath fading for a differential phase shift keying digital signal having a sequence of symbols occurring in successive symbol time periods according to claim 1 wherein:

the differential phase shift keying digital signal is a quarternary differential phase shift keying signal having in-phase and quadrature components for each symbol;

the demoudulating means of each receiving branch comprises means for demodulating the one version of the digital signal in each symbol period to form an in-phase baseband signal and a quadrature phase baseband signal for the the symbol time period, and the means for generating the phase difference prescribed component signal comprises means responsive to the in phase baseband signals from the demodulating means for generating a signal respresentative of the phase difference between the in-phase baseband signals of immediately successive symbols of the digital signal version, and means responsive to the quadrature phase baseband signals from the demodulating means for generating a signal respresentative of the phase difference between the quadrature phase baseband signals of immediately successive symbols of the digital signal version; and the means for forming the signal representing each prescribed component of the phase difference signal corresponding to the transmitted digital signal comprises means reponsive to the generated in-phase phase difference component signal of each symbol time period from the plurality of receiving branches for forming a signal respresentative of the in-phase difference component signal of the transmitted digital signal in the symbol period, and means responsive to the generated quadrature-phase phase difference component signal of each symbol time period from the receiving branches for forming a signal representative of the quadrature-phase phase difference component signal of the transmitted digital signal in the symbol time period.

7. A spatial diversity arrangement in a mobile radio system subject to multipath fading for receiving a quarternary differential phase shift keying digital signals having a sequence of symbols occurring in successive symbol time period comprising:

a plurality of spaced antennas each receiving a different version of a transmitted digital signal;

a plurality of receiving branches each comprising means connected to a predetermined different one of the spaced antennas and responsive to the digital signal version from the connected antenna for demodulating the one version of the digital signal in each symbol period to form an in-phase baseband signal and a quadrature phase baseband signal for the symbol time period, and means responsive to the in-phase baseband signal from the demodulating means for generating a signal representative of the phase difference between the in-phase baseband signals of immediately successive symbol period of the digital signal version, and means responsive to the quadrature phase baseband signals from the demodulating means for generating a signal representative of the phase difference between the quadrature phase baseband signal of immediately successive symbol periods of the digital signal version; and means connected to the in-phase difference generating means of the plurality of receiving branches responsive to the generated in-phase phase difference signal of each symbol time period from the plurality of receiving branches for forming a signal representative of the in-phase phase difference signal of the transmitted digital signal in the symbol period, and means connected to the quadrature-phase phase difference generating means of the plurality of receiving branches responsive to the generated quadrature-phase phase difference signal of each symbol time period from the plurality of receiving branches for forming a signal representative of the quadrature-phase phase difference signal, and means for deciding a symbol value based on a signal strength value in response to at least one of the means for forming a signal representative of the in-phase phase difference signal and the means for forming a signal representative of the quadrature-phase phase signal.

8. A spatial diversity arrangement in a mobile radio system subject to multipath fading for receiving a quarternary differential phase shift keying digital signal having a sequence of symbols occurring in successive symbol time periods according to claim 7 wherein the means for forming the in-phase phase difference signal and quadrature-phase phase difference signal of the transmitted digital signal in the symbol period comprises:

means for forming a first threshold signal and a second threshold signal;

means responsive to the generated in-phase phase difference signals from the branches for generating a signal representative of the absolute value of the in-phase phase difference component signal, means for forming a signal corresponding to the difference between the first threshold and each absolute value signal of the in-phase phase difference signal and means for selecting the branches in-phase phase difference signal having the minimum difference corresponding signal, means responsive to the quadrature-phase phase difference signals from the branches for generating a signal representative of the absolute value of the quadrature-phase difference component signal of each branch, means for forming a signal corresponding to the difference between the second threshold and each absolute value signal of the quadrature-phase phase difference prescribed component signal of each branch, and the means for deciding including means for selecting the branch quadrature-phase phase difference signal having the minimum difference corresponding signal.

9. A spatial diversity arrangement in a mobile radio system subject to multipath fading for receiving a quarternary differential phase shift keying digital signal having a sequence of symbols occurring in successive symbol time periods according to claim 7 wherein the means for forming the in-phase phase difference signal and the quadrature-phase phase difference signal of the transmitted digital in the symbol period comprises:

means responsive to the generated in-phase phase difference signal from each branch for squaring the branch in-phase phase difference signal, means responsive to the generated quadrature-phase phase difference signal from each branch for squaring the branch guadrature-phase phase difference signal, means responsive to the squared in-phase and quadrature-phase phase difference signals for summing the squared in-phase and the squared quadrature-phase phase difference signals of each branch, means responsive to the sum of the squared in-phase and quadrature-phase phase difference signals of each branch for forming a first signal representative of the sum of the square of the generated in-phase phase difference signal and the square of the generated quadrature-phase phase difference signal for the branch; and the means for deciding including means for selecting the generated in-phase phase difference signal and the generated quadrature-phase difference signal of the branch having the maximum first signal.

10. A spatial diversity arrangement in a mobile radio system subject to multipath fading for receiving a quarternary differential phase shift keying digital signal having a sequence of symbols occurring in successive symbol time periods according to claim 7 wherein the means for forming the in-phase phase difference signal and the quadrature-phase phase difference signal of the transmitted digital signal in the symbol period comprises:
  means responsive to the generated in-phase phase difference signals from the branches for selecting the maximum generated in-phase phase difference signal; and
  means responsive to the generated quadrature-phase phase difference signal from the branches for selecting the maximum generated quadrature-phase phase difference signal.

11. A spatial diversity arrangement in a mobile radio system subject to multipath fading for receiving a quarternary differential phase shift keying digital signal having a sequence of symbols occurring in successive symbol time periods according to claim 7 wherein the means for forming the in-phase phase difference signal and the quadrature-phase phase difference signal of the transmitted digital signal in the symbol period comprises:
  means for algebraically summing the generated in-phase phase difference signals from the branches; and
  means for algebraically summing the generated quadrature-phase phase difference signals from the branches.

* * * * *